US009602475B2

(12) United States Patent
Bernheim et al.

(10) Patent No.: US 9,602,475 B2
(45) Date of Patent: *Mar. 21, 2017

(54) SYSTEM AND METHOD FOR GRID BASED CYBER SECURITY

(71) Applicants: Astrolink International LLC, Bethesda, MD (US); Dominion Energy Technologies, Inc., Richmond, VA (US)

(72) Inventors: Henrik F. Bernheim, Denver, CO (US); Marcia Reid Martin, Longmont, CO (US); Steven J. Berens, Boulder, CO (US); John J. Loporto, Superior, CO (US); Theodore V. Niemann, Fort Collins, CO (US)

(73) Assignees: Astrolink International LLC, Bethesda, MD (US); Dominion Energy Technologies, Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,780

(22) Filed: May 23, 2015

(65) Prior Publication Data

US 2016/0112378 A1 Apr. 21, 2016

Related U.S. Application Data

(63) Continuation of application No. 13/493,983, filed on Jun. 11, 2012, now Pat. No. 9,059,842.

(Continued)

(51) Int. Cl.
*H04L 29/06* (2006.01)
*H04L 9/08* (2006.01)
(Continued)

(52) U.S. Cl.
CPC ............ *H04L 63/0428* (2013.01); *G05F 1/66* (2013.01); *H04B 3/54* (2013.01); *H04L 9/083* (2013.01);
(Continued)

(58) Field of Classification Search
None
See application file for complete search history.

(56) References Cited

U.S. PATENT DOCUMENTS 4,200,770 A 4/1980 Hellman et al.
4,371,867 A 2/1983 Gander
(Continued)

FOREIGN PATENT DOCUMENTS

CN 101770007 A 7/2010
EP 0629098 A2 12/1994
(Continued)

OTHER PUBLICATIONS

Search Report for Japanese Patent Application No. 2011-512749, search date Aug. 14, 2013, 29 pages.
(Continued)

*Primary Examiner* — Christopher Revak
(74) *Attorney, Agent, or Firm* — Withrow & Terranova, PLLC (57) ABSTRACT

A method and system for providing a secure communication network using an electrical distribution grid is disclosed. A device connected to the electrical distribution grid initiates a request for a secured key token by signaling an intelligent communicating device residing at or near an edge of the grid. The intelligent communicating device forwards the request to a receiver at a distribution substation on the electrical grid. This receiver enhances the properties of the request such that a grid location for the request can be inferred. The enhanced request is forwarded to a server at the distribution substation, which compares the request grid location to a Grid Map and Policies of known secure grid locations. Any inconsistencies between the grid location
(Continued)

BIDIRECTIONAL ON-GRID LONG-RANGE COMMUNICATIONS inferred from the enhanced request and the Grid Map and Policies locations are considered evidence of tampering, and the server rejects the request.

7 Claims, 3 Drawing Sheets

Related U.S. Application Data (60) Provisional application No. 61/495,173, filed on Jun. 9, 2011.

(51) Int. Cl.
  H04L 9/32 (2006.01)
  H04B 3/54 (2006.01)
  G05F 1/66 (2006.01)
(52) U.S. Cl.
  CPC ......... H04L 9/0827 (2013.01); H04L 9/0872 (2013.01); H04L 9/3234 (2013.01); *H04B 2203/5433* (2013.01); *H04L 63/062* (2013.01); *H04L 63/0807* (2013.01); *H04L 63/107* (2013.01)

(56) References Cited

U.S. PATENT DOCUMENTS

| | | |
|---|---|---|
| 6,212,560 B1 | 4/2001 | Fairchild |
| 6,366,062 B2 | 4/2002 | Baretich et al. |
| 6,373,399 B1 | 4/2002 | Johnson et al. |
| 6,650,249 B2 | 11/2003 | Meyer et al. |
| 6,690,655 B1 | 2/2004 | Miner et al. |
| 6,961,641 B1 | 11/2005 | Forth et al. |
| 7,069,117 B2 | 6/2006 | Wilson et al. |
| 7,076,378 B1 | 7/2006 | Huebner |
| 7,188,003 B2 | 3/2007 | Ransom et al. |
| 7,236,765 B2 | 6/2007 | Bonicatto et al. |
| 7,280,931 B1 * | 10/2007 | Kim .................. G05B 19/4184 700/286 |
| 7,369,579 B2 | 5/2008 | Logvinov et al. |
| 7,571,028 B2 | 8/2009 | Lapinski et al. |
| 7,701,330 B2 | 4/2010 | Iwamura |
| 7,808,128 B1 | 10/2010 | Weber, Jr. et al. |
| 7,870,600 B2 | 1/2011 | Huotari et al. |
| 7,873,077 B2 | 1/2011 | Downey et al. |
| 7,948,255 B2 | 5/2011 | Shim et al. |
| 8,207,726 B2 | 6/2012 | Vaswani et al. |
| 8,519,832 B2 | 8/2013 | Loporto et al. |
| 8,639,922 B2 | 1/2014 | Phatak |
| 8,639,992 B2 | 1/2014 | Haufe et al. |
| 8,711,995 B2 | 4/2014 | Glende |
| 8,737,555 B2 | 5/2014 | Haug et al. |
| 8,818,742 B2 | 8/2014 | Ansari |
| 8,872,667 B2 * | 10/2014 | Bhageria .............. G08B 21/00 340/635 |
| 9,059,842 B2 * | 6/2015 | Bernheim ............ H04L 9/0827 |
| 2001/0018561 A1 | 8/2001 | Tanida |
| 2001/0037378 A1 | 11/2001 | Hirayama |
| 2002/0069299 A1 | 6/2002 | Rosener et al. |
| 2002/0089927 A1 | 7/2002 | Fischer et al. |
| 2003/0098671 A1 | 5/2003 | Hochgraf |
| 2004/0062267 A1 | 4/2004 | Minami et al. |
| 2004/0110044 A1 | 6/2004 | McArthur et al. |
| 2004/0226621 A1 | 11/2004 | Phillips et al. |
| 2004/0227621 A1 | 11/2004 | Cope et al. |
| 2005/0005150 A1 | 1/2005 | Ballard |
| 2005/0017848 A1 | 1/2005 | Flen et al. |
| 2005/0043860 A1 | 2/2005 | Petite |
| 2005/0144437 A1 | 6/2005 | Ransom et al. |
| 2005/0207079 A1 | 9/2005 | Tiller et al. |
| 2006/0091877 A1 | 5/2006 | Robinson et al. |
| 2006/0152344 A1 | 7/2006 | Mowery, Jr. |
| 2007/0100506 A1 | 5/2007 | Teichmann |
| 2007/0101438 A1 | 5/2007 | Govindarajan |
| 2007/0114987 A1 | 5/2007 | Kagan |
| 2007/0162550 A1 | 7/2007 | Rosenberg |
| 2007/0208521 A1 | 9/2007 | Petite et al. |
| 2007/0211401 A1 | 9/2007 | Mak |
| 2007/0237181 A1 | 10/2007 | Cho et al. |
| 2007/0271383 A1 * | 11/2007 | Kim ................. H04L 63/08 709/227 |
| 2007/0297425 A1 | 12/2007 | Chirco |
| 2008/0040479 A1 | 2/2008 | Bridge et al. |
| 2008/0109387 A1 | 5/2008 | Deaver et al. |
| 2008/0209481 A1 | 8/2008 | Barrett |
| 2008/0273521 A1 | 11/2008 | Shao et al. |
| 2008/0312851 A1 | 12/2008 | Kagan et al. |
| 2009/0027061 A1 | 1/2009 | Curt et al. |
| 2009/0088907 A1 | 4/2009 | Lewis et al. |
| 2009/0096416 A1 | 4/2009 | Tonegawa et al. |
| 2009/0210197 A1 | 8/2009 | Cleary |
| 2009/0219932 A1 | 9/2009 | Kobayashi |
| 2009/0240504 A1 | 9/2009 | Pang et al. |
| 2009/0256686 A1 | 10/2009 | Abbot et al. |
| 2010/0005273 A1 | 1/2010 | Lee et al. |
| 2010/0007219 A1 | 1/2010 | de Buda et al. |
| 2010/0007336 A1 | 1/2010 | de Buda |
| 2010/0010857 A1 | 1/2010 | Fadell |
| 2010/0054349 A1 | 3/2010 | Spencer |
| 2010/0134089 A1 | 6/2010 | Uram et al. |
| 2010/0141392 A1 | 6/2010 | Jo et al. |
| 2010/0188260 A1 | 7/2010 | Cornwall et al. |
| 2010/0217549 A1 | 8/2010 | Galvin et al. |
| 2010/0217550 A1 | 8/2010 | Crabtree et al. |
| 2010/0262313 A1 | 10/2010 | Chambers et al. |
| 2010/0262393 A1 | 10/2010 | Sharma et al. |
| 2010/0286840 A1 | 11/2010 | Powell et al. |
| 2010/0296560 A1 | 11/2010 | Sadan et al. |
| 2010/0306533 A1 * | 12/2010 | Phatak .................. G06F 21/34 713/156 |
| 2011/0035073 A1 | 2/2011 | Ozog |
| 2011/0043340 A1 | 2/2011 | Kim et al. |
| 2011/0103429 A1 | 5/2011 | Tanaka et al. |
| 2011/0121654 A1 | 5/2011 | Recker et al. |
| 2011/0122798 A1 | 5/2011 | Hughes et al. |
| 2011/0130992 A1 | 6/2011 | Kolwalkar et al. |
| 2011/0133655 A1 | 6/2011 | Recker et al. |
| 2011/0140911 A1 | 6/2011 | Pant et al. |
| 2011/0196546 A1 | 8/2011 | Muller et al. |
| 2011/0216747 A1 | 9/2011 | Shao et al. |
| 2011/0224935 A1 | 9/2011 | Hampel et al. |
| 2011/0267202 A1 | 11/2011 | Efthymiou et al. |
| 2011/0285382 A1 | 11/2011 | Kolwalkar et al. |
| 2012/0036250 A1 | 2/2012 | Vaswani et al. |
| 2012/0041696 A1 | 2/2012 | Sanderford, Jr. et al. |
| 2012/0052870 A1 | 3/2012 | Habicher |
| 2012/0062210 A1 | 3/2012 | Veillette |
| 2012/0075099 A1 | 3/2012 | Brown |
| 2012/0139554 A1 | 6/2012 | Parsons |
| 2012/0155557 A1 | 6/2012 | Bush et al. |
| 2012/0158329 A1 | 6/2012 | Hurri et al. |
| 2012/0185838 A1 | 7/2012 | Schwartzman et al. |
| 2012/0195355 A1 | 8/2012 | El-Essawy et al. |
| 2012/0201155 A1 | 8/2012 | Du et al. |
| 2012/0232915 A1 | 9/2012 | Bromberger |
| 2012/0242499 A1 | 9/2012 | Ree |
| 2012/0245869 A1 | 9/2012 | Ansari |
| 2012/0262355 A1 | 10/2012 | He et al. |
| 2012/0265355 A1 | 10/2012 | Bernheim et al. |
| 2012/0275526 A1 | 11/2012 | Hughes |
| 2012/0310424 A1 | 12/2012 | Taft |
| 2012/0310558 A1 | 12/2012 | Taft |
| 2012/0313620 A1 | 12/2012 | Swarztrauber et al. |
| 2012/0314782 A1 | 12/2012 | Boivin et al. |
| 2012/0316696 A1 | 12/2012 | Boardman et al. |
| 2012/0323388 A1 | 12/2012 | Littrell et al. |
| 2013/0013232 A1 | 1/2013 | Parwal et al. |
| 2013/0031201 A1 | 1/2013 | Kagan et al. |
| 2013/0034086 A1 | 2/2013 | Martin et al. |
| 2013/0132555 A1 | 5/2013 | Wang et al. |
| 2013/0151177 A1 | 6/2013 | Hughes |
| 2013/0193767 A1 | 8/2013 | Carralero et al. |

(56) References Cited

U.S. PATENT DOCUMENTS

| | | | |
|---|---|---|---|
| 2013/0204450 A1 | 8/2013 | Kagan et al. | |
| 2014/0035372 A1 | 2/2014 | Normoyle et al. | |
| 2014/0062719 A1 | 3/2014 | Rowitch | |
| 2014/0118163 A1 | 5/2014 | Li et al. | |
| 2014/0172723 A1 | 6/2014 | Borisov et al. | |
| 2014/0191568 A1 | 7/2014 | Partovi | |
| 2014/0233620 A1 | 8/2014 | Bernheim et al. | |
| 2014/0233662 A1 | 8/2014 | Hansell et al. | |
| 2014/0236365 A1 | 8/2014 | Martin et al. | |
| 2014/0236366 A1* | 8/2014 | Livadaras | G06Q 10/00 700/286 |
| 2014/0236506 A1 | 8/2014 | Nikovski et al. | |
| 2014/0300210 A1 | 10/2014 | Abi-Ackel et al. | |
| 2014/0359595 A1 | 12/2014 | Sehgal et al. | |
| 2014/0361907 A1 | 12/2014 | Bernheim et al. | |
| 2014/0368189 A1 | 12/2014 | Bernheim et al. | |
| 2015/0010093 A1 | 1/2015 | Hansell et al. | |
| 2015/0316620 A1 | 11/2015 | Luan et al. | |

FOREIGN PATENT DOCUMENTS

| | | |
|---|---|---|
| EP | 1901145 A2 | 3/2008 |
| EP | 2330430 A1 | 6/2011 |
| EP | 2566125 A1 | 3/2013 |
| JP | 2003259696 A | 9/2003 |
| JP | 2003339120 A | 11/2003 |
| JP | 2004147063 A | 5/2004 |
| JP | 2005252671 A | 9/2005 |
| JP | 2006262570 | 9/2006 |
| JP | 2007185083 A | 7/2007 |
| JP | 2008508781 A1 | 3/2008 |
| JP | 2008098812 A | 4/2008 |
| JP | 2008124859 A | 5/2008 |
| JP | 2013005718 A1 | 1/2013 |
| WO | 2009067250 A1 | 5/2009 |
| WO | 2010141859 A1 | 12/2010 |
| WO | 2014006662 A1 | 1/2014 |

OTHER PUBLICATIONS

Office Action for Japanese Patent Application No. 2011-512749, drafting date Sep. 4, 2013, 7 pages.
International Preliminary Report on Patentability for PCT/US2014/041396, mailed Dec. 17, 2015, 8 pages.
International Preliminary Report on Patentability for PCT/US2014/042300, mailed Dec. 23, 2015, 9 pages.
International Preliminary Report on Patentability for PCT/US2014/042393, mailed Dec. 23, 2015, 11 pages.
Office Action for Canadian Patent Application No. 2,727,034, mailed Nov. 26, 2015, 4 pages.
Decision of Final Rejection for Japanese Patent Application No. 2014-119504, mailed Nov. 10, 2015, 5 pages.
Translation of Decision to Grant for Japanese Patent Application No. 2014-119505, mailed Dec. 15, 2015, 3 pages.
Office Action for Cuban Patent Application No. 2015-0088, mailed Oct. 30, 2015, 3 pages.
Final Office Action for U.S. Appl. No. 13/888,102, mailed Dec. 24, 2015, 18 pages.
Non-Final Office Action for U.S. Appl. No. 13/911,849, mailed Nov. 24, 2015, 15 pages.
Author Unknown, "MicroPianet® Voltage Regulators," Energyldeas Clearinghouse PTR #6.4, Product and Technology Review, Jun. 2008, 6 pages, http://www.energyideas.org/documents/factsheets/PTR/Microplanet.pdf.
Author Unknown, "Prime Alliance Official Website," Web, Date Accessed: Nov. 4, 2015, 3 pages, http://www.prime-alliance.org/.
Author Unknown, "The G3 PLC Alliance Unveils its Interoperability process," The G3-PLC Alliance, Oct. 8, 2012, Paris, France, http://www.g3-plc.com/content/press-releases, p. 1.
Author Unknown, "TWACS Low Frequency Power Line Communication Signals Problematic to Public Health," dated May 3, 2013, 20 pages, http://www.eiwellspring.org/smartmeter/TWACS.pdf.
Author Unknown, "Universal Powerline Bus Communication Technology Overview," Powerline Control Services, Jan. 8, 2002, 13 pages, http://pulseworx.com/downloads/upb/UpbOverview.pdf.
Baggini, Angelo "Handbook of Power Quality" John Wiley & Sons, Ltd., 2008, 65 pages.
Bates, Michael, "CVR has Potential Beyond Pushing Efficiencies on Feeders." renewGRID, Mar. 26, 2012, 2 pages, http://www.renew-grid.com/e107plugins/contenl/contenl.php?conten1.8215.
Bresesti, Paola et al., "SDNO: Smart Distribution Network Operation Project", Power Engineering Society General Meeting, IEEE, 2007, 4 pages.
Choi, Moonsuk et al., "Design of Integrated Meter Reading System based on Power-Line Communication", Power Line Communications and Its Applications, IEEE, International Symposium, 2008, pp. 280-284.
Collins, Dermot et al., "Transmission on Power Line Cables," Telektronikk, vol. 95, No. 2/3, 1999, pp. 134-137.
Dilek, M., "Integrated Design of Electrical Distribution Systems: Phase Balancing and Phase Prediction Case Studies," Dissertation, 2001, 150 pages, http://scholar.lib.vt.edu/theses/available/etd-11132001-222401/.
Goh, Chong Hock K., "A Current Study of Automatic Meter Reading Solutions via Power Line Communications," 19 pages, http://wpweb2k.gsia.cmu.edu/ceic/publicatons.htm. (Published 2003 or later as evidenced by the bibliography).
Ha, K. A., "Power Line Communication Technology," Presentation at Hong Kong Institute of Engineers Seminar on Last Mile Technology, Jun. 20, 2003, 24 pages.
Hooijen, Olaf G. "A Channel Model for the Residential Power Circuit Used as a Digital Communications Medium," IEEE Transactions on Electromagnetic Compatibility, vol. 40, No. 4, Nov. 1998, pp. 331-336.
McGhee, Jim et al., "Smart High Voltage Substation based on IEC 61850 Process Bus and IEEE 1588 Time Synchronization" 2010 First IEEE International Conference on Smart Grid Communications, IEEE, Oct. 4-6, 2010, pp. 489-494.
Mitchell, Travis, "Dominion Conservation Voltage Reduction software reduces energy use by 2.8%," Fierce Energy Daily, Sep. 27, 2011, 3 pages, http://www.fierceenergy.com/story/dominion-conservation-voltage-reduction-soflware-reduces-energy-use-28/Sep. 27, 2011.
Montoya, Luis F.,"Power Line Communications Performance Overview of the Physical Layer of Available Protocols," Thesis of Research, University of Florida, Gainesville, Florida, Date Unknown, pp. 1-15.
Moreno-Munoz A., et al., "Integrating Power Quality to Automated Meter Reading", IEEE Industrial Electronics Magazine, IEEE, US, vol. 2, No. 2, Jun. 17, 2008, pp. 10-18.
Newbury, John, "Efficient Communication Services Using the Low Voltage Distribution Line," Proceedings of 2002 PES Winter Meeting, IEEE, 2002, pp. 579-591.
Nyack, Cuthbert A., "Convolution and Autocorrelation," Web, Date Accessed: Nov. 4, 2015, 3 pages, http://cnyack.homestead.com/files/aconv/convau1.htm.
Pallares-Lopez et al., "Embedding synchronism in SmartGrid with IEEE1588-based for Intelligent Electronics," 2010 First IEEE International Conference on Smart Grid Communications, published/presented Oct. 4-6, 2010, Gaithersburg, Maryland, 7 pages.
Pavlidou, Niovi et al., "Power Line Communications: State of the Art and Future Trends," IEEE Communications Magazine, IEEE, vol. 41, No. 4, Apr. 2003, pp. 34-40.
Rye, Dave, "The X-10 Powerhouse Power Line Interface Model #PL513 and Two-Way Power Line Interface Model #TW523," X-10 Inc., X-10.RTM. Powerhouse (TM) Technical Note, Revision 2.4, 1991, 12 pages.
Schickhuber, Gerald et al., "Control Using Power Lines—A European View," Computing & Control Engineering Journal, vol. 8, No. 4, Aug. 1997, pp. 180-184.
Sherman et al, "Location Authentication through Power Line Communication: Design, Protocol, and Analysis of a New Out of Band Strategy," Cyber Defense Lab, Department of CSEE, University of Maryland, Baltimore County, IEEE, 2010, pp. 279-284.

(56) References Cited

OTHER PUBLICATIONS

Van Rensburg, Petrus A. Hanse et al., "Design of a Bidirectional Impedance-Adapting Transformer Coupling Circuit for Low-Voltage Power-Line Communications," IEEE Transactions on Power Delivery, IEEE, vol. 20, No. 1, Jan. 2005, pp. 64-70.
International Search Report for PCT/US2014/016538, mailed Jun. 16, 2014, 3 pages.
International Preliminary Report on Patentability for PCT/US2014/016538, mailed Sep. 3, 2015, 10 pages.
International Search Report for PCT/US2014/016540, mailed Jun. 17, 2014, 3 pages.
International Preliminary Report on Patentability for PCT/US2014/016540, mailed Sep. 3, 2015, 9 pages.
International Search Report for PCT/US2014/016535, mailed Jun. 3, 2014, 2 pages.
International Preliminary Report on Patentability for PCT/US2014/016535, mailed Sep. 3, 2015, 8 pages.
International Search Report and Written Opinion for PCT/US2014/041396, mailed Oct. 29, 2014, 12 pages.
International Search Report and Written Opinion for PCT/US2014/042300, mailed Oct. 20, 2014, 16 pages.
International Search Report and Written Opinion for PCT/US2014/042393, mailed Oct. 20, 2014, 15 pages.
International Search Report for PCT/US2009/046644, mailed Mar. 2, 2010, 7 pages.
International Preliminary Report on Patentability for PCT/US2009/046644, mailed Dec. 6, 2010, 10 pages.
International Search Report for PCT/US2012/033789, mailed Sep. 6, 2012, 4 pages.
International Search Report for PCT/US2012/041971, mailed Dec. 7, 2012, 5 pages.
International Search Report for PCT/US2012/049524, mailed Jan. 3, 2013, 3 pages.
Non-Final Office Action for U.S. Appl. No. 13/566,481, mailed Aug. 7, 2015, 27 pages.
Non-Final Office Action for U.S. Appl. No. 13/493,983, mailed Feb. 5, 2014, 11 pages.
Final Office Action for U.S. Appl. No. 13/493,983, mailed Oct. 31, 2014, 12 pages.
Non-Final Office Action for U.S. Appl. No. 13/448,005, mailed Sep. 11, 2014, 20 pages.
Non-Final Office Action for U.S. Appl. No. 13/448,005, mailed Apr. 15, 2015, 22 pages.
Non-Final Office Action for U.S. Appl. No. 12/480,493, mailed Jul. 16, 2012, 24 pages.
Notice of Allowance and Examiner-Initiated Interview Summary for U.S. Appl. No. 12/480,493, mailed Jun. 20, 2013, 13 pages.
Non-Final Office Action for U.S. Appl. No. 13/896,029, mailed Sep. 18, 2015, 16 pages.
Non-Final Office Action for U.S. Appl. No. 13/871,944, mailed Oct. 16, 2015, 13 pages.
Non-Final Office Action for U.S. Appl. No. 13/888,102, mailed Jul. 9, 2015, 18 pages.
Sendin, Alberto, et al., "Enhanced Operation of Electricity Distribution Grids Through Smart Metering PLC Network Monitoring, Analysis and Grid Conditioning," Energies, vol. 6, Issue 1, Jan. 21, 2013, www.mdpi.com/journal/energies, pp. 539-556.
Wetula, Andrzej, "A Hilbert Transform Based Algorithm for Detection of a Complex Envelope of a Power Grid Signals—an Implementation," Journal of Electrical Power Quality and Utilisation, vol. 14, Issue 2, 2008, EPQU Journal, pp. 13-18.

Partial Supplementary European Search Report for European Patent Application No. 14754343.3, mailed Feb. 8, 2016, 5 pages.
International Search Report and Written Opinion for International Patent Application No. PCT/US2015/058423, mailed Jan. 19, 2016, 12 pages.
International Search Report and Written Opinion for International Patent Application No. PCT/US2015/058492, mailed Feb. 26, 2016, 18 pages.
International Search Report and Written Opinion for International Patent Application No. PCT/US2015/063752, mailed Mar. 24, 2016, 16 pages.
Notice of Allowance and Examiner Initiated Interview Summary for U.S. Appl. No. 13/911,849, mailed Apr. 5, 2016, 10 pages.
Non-Final Office Action for U.S. Appl. No. 14/304,035, mailed Feb. 25, 2016, 22 pages.
Notice of Allowance for U.S. Appl. No. 13/566,481, mailed Feb. 26, 2016, 7 pages.
Extended European Search Report for European Patent Application No. 14754343.3, mailed May 24, 2016, 12 pages.
Examination Report for European Patent Application No. 09759619.1, mailed May 13, 2016, 7 pages.
Colson, C.M., "Algorithms for Distributed Decision-Making for Multi-agent Microgrid Power Management," IEEE Power and Energy Society General Meeting, Jul. 24-29, 2011, San Diego, California, IEEE, pp. 1-8.
Final Office Action for U.S. Appl. No. 13/896,029, mailed Jun. 22, 2016, 22 pages.
Final Office Action for U.S. Appl. No. 13/871,944, mailed Jun. 21, 2016, 22 pages.
Corrected Notice of Allowance for U.S. Appl. No. 13/911,849, mailed May 31, 2016, 4 pages.
Final Office Action for U.S. Appl. No. 13/448,005, mailed Jun. 6, 2016, 11 pages.
Non-Final Office Action for U.S. Appl. No. 13/896,029, mailed Nov. 10, 2016, 18 pages.
Notice of Allowance for U.S. Appl. No. 13/871,944, mailed Oct. 4, 2016, 9 pages.
Final Office Action for U.S. Appl. No. 14/304,035, mailed Aug. 26, 2016, 18 pages.
Non-Final Office Action for U.S. Appl. No. 14/304,648, mailed Sep. 7, 2016, 4 pages.
Partial Supplementary European Search Report for European Patent Application No. 14754339.1, mailed Oct. 4, 2016, 6 pages.
Partial Supplementary European Search Report for European Patent Application No. 14754714.5, mailed Oct. 6, 2016, 6 pages.
Extended European Search Report for European Patent Application No. 14754339.1, mailed Jan. 16, 2017, 10 pages.
Office Action No. 13556 for Columbian Patent Application No. 15-222367, mailed Nov. 28, 2016, 13 pages.
Examination Report No. 1 for Australian Patent Application No. 2014219244, mailed Dec. 21, 2016, 4 pages.
Extended European Search Report for European Patent Application No. 14754714.5, mailed Jan. 16, 2017, 10 pages.
Extended European Search Report for European Patent Application No. 14808081.5, mailed Jan. 30, 2017, 7 pages.
Extended European Search Report for European Patent Application No. 14810273.4, mailed Feb. 1, 2017, 12 pages.
Extended European Search Report for European Patent Application No. 14811042.2, issued Jan. 2, 2017, 7 pages.
Examination Report No. 1 for Australian Patent Application No. 2014219246, mailed Dec. 22, 2016, 3 pages.
Advisory Action for U.S. Appl. No. 14/304,035, mailed Nov. 30, 2016, 3 pages.

\* cited by examiner

FIGURE 1
BIDIRECTIONAL ON-GRID LONG-RANGE COMMUNICATIONS

FIGURE 2
MIXED MODE COMMUNICATIONS

FIGURE 3
ISOLATED ENDPOINT

SYSTEM AND METHOD FOR GRID BASED CYBER SECURITY

CROSS REFERENCE TO RELATED APPLICATIONS

The present application is a continuation of United States non-provisional patent application number 13/493,983 filed on Jun. 11, 2012 and entitled System and Methods for Grid Based Cyber Security, now U.S. Pat. No. 9,059,842 B2, the disclosure of which is herewith incorporated by reference in its entirety, which in turn claims benefit under 35 USC §119(e) of U.S. Provisional Application No. 61/495,173, filed on Jun. 9, 2011.

BACKGROUND OF THE INVENTION

1. Field of the Invention

The present invention is directed generally toward the domain of network security, and in particular toward the use of the electrical distribution grid with a system for establishing the schematic location of nodes on the electrical distribution grid, as a key-courier network and as a means for authenticating the key requestor.

2. Background of the Invention

The electrical grid in the United States and most other areas of the world is historically divided into two networks: the transmission grid and the distribution grid. The transmission grid originates at a generation point, such as a coal-burning or atomic power plant, or a hydroelectric generator at a dam. DC power is generated, converted to high-voltage AC, and transmitted to distribution points, called distribution substations, via a highly controlled and regulated, redundant, and thoroughly instrumented high-voltage network. This high-voltage network has at its edge a collection of distribution substations. Over the last century, as the use of electrical power became more ubiquitous and more essential, and as a complex market in the trading and sharing of electrical power emerged, the technology of the transmission grid largely kept pace with the technological requirements of the market.

The second network, the distribution grid, is the portion of the electrical grid which originates at the distribution substations and has at its edge a collection of residential, commercial, and industrial consumers of energy. In contrast to the transmission grid, the technology of the distribution grid has remained relatively static since the mid-1930s until very recent years. Today, as concern grows over the environmental effects of fossil fuel usage and the depletion of non-renewable energy sources, interest has increased in augmenting the electrical distribution grid with communication instruments. The primary goals of this activity are energy-related—such as energy conservation, resource conservation, cost containment, and continuity of service. However, a side effect of establishing such networks is the ability to transmit information over an existing network, the distribution grid itself, which has special properties that enhance the security and particularly the authenticity and non-repudiability of transmitted messages.

Binary digital encryption has largely superseded all other forms of ciphers as the means of encoding sensitive communications in this digital age. Encryption and decryption algorithms require three components to work: the data itself (in the clear for encryption, or the encrypted string for decryption), a well-known algorithm, and a binary string called a key which must be known in order to drive the algorithm to produce the proper results.

Two major classes of encryption algorithms are in use and well-known in the art. In one class, the same key is used for both encryption and decryption, so that both the data source and the data destination have a copy of the key. These algorithms, typified by the Advanced Encryption Standard (AES), are known as symmetric key or shared secret methods. Such methods, especially AES itself, are favored for embedded or machine-to-machine applications because the algorithms are relatively low-cost in terms of code space and execution time, and because the keys are relatively short (128 to 256 bits at present). Also, if the data payload is carefully chosen, as little as one bit is added to the message length by the encryption process. This added length is called overhead.

Algorithms of the second major class are known as asymmetric key or public key methods. In these schemes, a different key is used to encrypt the data than is used to decrypt the data. The encryption key is publically known, so that anyone can send an encrypted message. The decryption key must be kept private in order to preserve message security. Public key methods are favored for lower-traffic applications such as client-server or web-service applications, where a broadband network and relatively powerful computers are used at both ends of a secure transaction. The keys are longer, the algorithms are more complex, and the overhead is higher than in symmetric key methods. One well-known method of mitigating the computational and data overhead of public key encryption is to use it only for initially authenticating and establishing a secure session, and exchanging a shared secret. Then longer messages can be exchanged using symmetric-key encryption.

The elements of data security include Privacy, Authentication, Integrity, and Non-repudiation (PAIN). Encryption itself provides only the privacy element, in that it ensures that an agency who is merely intercepting signals on a network cannot extract the information encoded in a signal sequence or message. Authentication is the process of ensuring that an agency initiating or responding to a secure transaction is who it claims to be and not a malicious intruder. Integrity refers to the ability to detect tampering with a message in transit, and either prevent it or make it evident. Non-repudiability means the sender cannot deny having sent the message which was received.

Regardless of the encryption method used, the primary security risks in data communications are not associated with "breaking" the encryption but with other elements of PAIN. Primarily, risks arise from the failure of one of these processes:

Authenticating the requestor of a key or a secure transaction

Authenticating the key authority (who may or may not be the agency who receives and decrypts the data)

Distributing keys in a secure manner

Establishing that a message actually originated with the purported sender and not some other party who gained access to the encryption key (including the purported receiver, who may self-generate a message and claim to have received it from the purported sender).

Well-known means of ensuring full PAIN security involve both the use of a secure encryption algorithm and either a secure "out of band" means of exchanging keys, a trusted third party (TTP) responsible for generating and distributing keys, or both. The simplest example of this is the case of two individuals A and B who wish to exchange private messages over a computer network. They meet face to face and agree on a secret encryption key and an encryption algorithm. They then separate and use their shared secret to exchange private messages. Because the nature of (good) shared secret keys is such that the probability someone else will choose the same secret as A and B is very low, as long as neither party breaks the trust (reveals the secret), the digital conversation between A and B is private and authenticated. A and B could ensure integrity by making further agreements about the organization or contents (such as a hash code) of the messages. This method is never non-repudiable, however, because A could generate a message and claim that it came from B, and the message would be indistinguishable from one actually generated by B.

The best-known method for establishing a fully secure channel, known as the Diffie-Hellman method, is based on the existence of asymmetric-key encryption algorithms and is described in U.S. Pat. No. 4,200,770 to Hellman et al. In this method, A and B each begin with a pair of distinct asymmetric keys. B sends his public key to A, and A sends his public key to B. A and B now each employs his own private key and his correspondent's public key to generate a value called the shared secret, which is in itself a pair of asymmetric keys. The essence of the Diffie-Hellman method is the proof that the two mismatched pairs of public and private keys can, in fact, be used to independently generate the same shared secret. B then generates a symmetric key, using the "public" portion of the shared secret to encrypt it, and sends it to A. A uses the "private" portion of the shared secret to decrypt the symmetric key. Now, A and B can send private communications back and forth efficiently using the symmetric key. The last step is only needed because of the inefficiency of asymmetric keys as a bulk encryption method.

The Diffie-Hellman algorithm is known to be vulnerable to a form of security attack known as man-in-the-middle. In such attacks, the initial exchange of public keys is intercepted by the attacker, who substitutes different public keys for those sent by A and B. If the attacker can intercept both sides of the exchange long enough to learn the symmetric key, then the attacker can pretend to be either member of the secure exchange, and can eavesdrop on the conversation and even alter the information in transit. Public Key Infrastructures (PKIs) have been created to correct this. In a PKI, a trusted third party (TTP) is used by A and B to mediate the generation and exchange of keys. The TTP does this by combining the public keys with information that authenticates the party wishing to exchange information and with the digital signature of the TTP in a tamper-evident manner. Today, many widely used programs such as web browsers are pre-programmed to recognize and honor the format of such certificates and the signatures of widely-known TTPs, more commonly called Certificate Authorities or CAs.

In the year 2011, there were at least 2 documented cases where well-established and trusted CAs were hacked and fraudulent certificates were issued, allowing the fraudulent issuer to steal information. To date, the only remedy for this has been to revoke trust for CAs known to have issued fraudulent certificates. Additionally, some specialized security needs exist where it is insufficient to authenticate the requesting user or device. For example, a physician may be authorized to use a mobile device to access electronic patient records from her home or office, but not from an internet café or other public place. In this situation, it is necessary to authenticate not only that the user of the device is the physician, but that the device is not in a public place where a patient's privacy could be compromised. In the most extreme examples of highly-secured operations, it is undesirable for the requesting user's interface device to be connected to a conventional network at all.

SUMMARY OF THE INVENTION

The present invention comprises a system of intelligent communicating devices (ICDs) residing at or near the edge of the electrical distribution grid. The electrical distribution grid comprises at least one central collection point. The ICDs transmit messages to at least one of the central collection points on the electrical distribution grid, using the distribution grid as the transmission medium. At the central collection point, a server is connected to a receiver for on-grid transmissions from the ICD to a gateway to a conventional wide-area network such as the Internet. On the wide-area network resides a central server which is the owner of a conventional Public Key Infrastructure (PKI) certificate, so that communications between the central server and the at least one collection point servers are secured by conventional secure protocols such as Transport Layer Security(TLS) or Secure Socket Layer (SSL). The central server runs a software program, the Authority, which is responsible for granting temporary authorizations for remote users to perform certain secured actions. The receiver at any of the at least one central collection points is capable of inferring the schematic location on the electrical distribution grid of any of the distributed ICDs from characteristics of the signal received from the ICD. On each of the ICDs resides a stored program which acts as the agent of the Authority in relaying requests and grants between remote users and the Authority. This system and method incorporates means of authenticating requestors, authorizing grants, ensuring that the receiver of the grant is the same agency as the requestor, and exchanging encryption keys which are more secure and more constrained to a location in time and space than conventional means alone can accomplish. Multiple embodiments of the invention are described, where in some embodiments all communication between the at least one collection point server and the requestor take place over the electrical distribution grid, and where in other embodiments a conventional network is employed to return the grant to the requestor, but the security benefits of the invention still apply.

DETAILED DESCRIPTION OF THE INVENTION

The present invention is directed generally toward the domain of network security, and in particular, toward the use of the electrical distribution grid enhanced with a system for establishing the schematic location of nodes on the electrical distribution grid, as a key-courier network and as a means for authenticating the key requestor.

The invention comprises a system for using an electrical distribution grid as a communication medium, wherein the system may be connected at one or more nodes to a conventional data communications network. The invention further includes a method whereby the electrical distribution grid, used as a communication medium, can be used to distribute encryption keys and to authenticate, authorize, and secure a time-and-space limited operation to be performed on a computing Device, PC, or Server or a time-and-space limited communications session to be conducted over a conventional data communications network. Application software resides on the Device, PC or Server, and engages in high-security operations and/or transactions. These high-security operations and/or transactions must be conducted in a secure location, and must be concluded within a limited space of time in order to minimize the probability of a security breach occurring. The present invention allows for secure distribution of limited permissions, or Key Tokens, which the applications require when initiating the secure operations and/or transactions. Client software, which communicates with various other component nodes of the present invention as described in more detail below, also resides on the Device, PC, or Server. All or part of the client software may be embodied as circuitry or firmware on a specialized networking interface card (NIC) for using the power path (such as from a wall plug) as a communication channel.

In some embodiments, the client software application secures limited permission to engage in the secure operations and/or transaction provided that the Device, PC or Server is not removed from the locale in which the secure operations and/or transactions were initiated, while the operations are in progress. In such embodiments, the software client running on the Device, PC, or Server cancels the secure operations and/or transactions if the Device, PC, or Server is disconnected from the power source or if evidence of a breach of the power path is detected either by the Device, PC, or Server, or the CD, or the ICD or the Server at the substation.

Embodiment 1.

Figure 1:
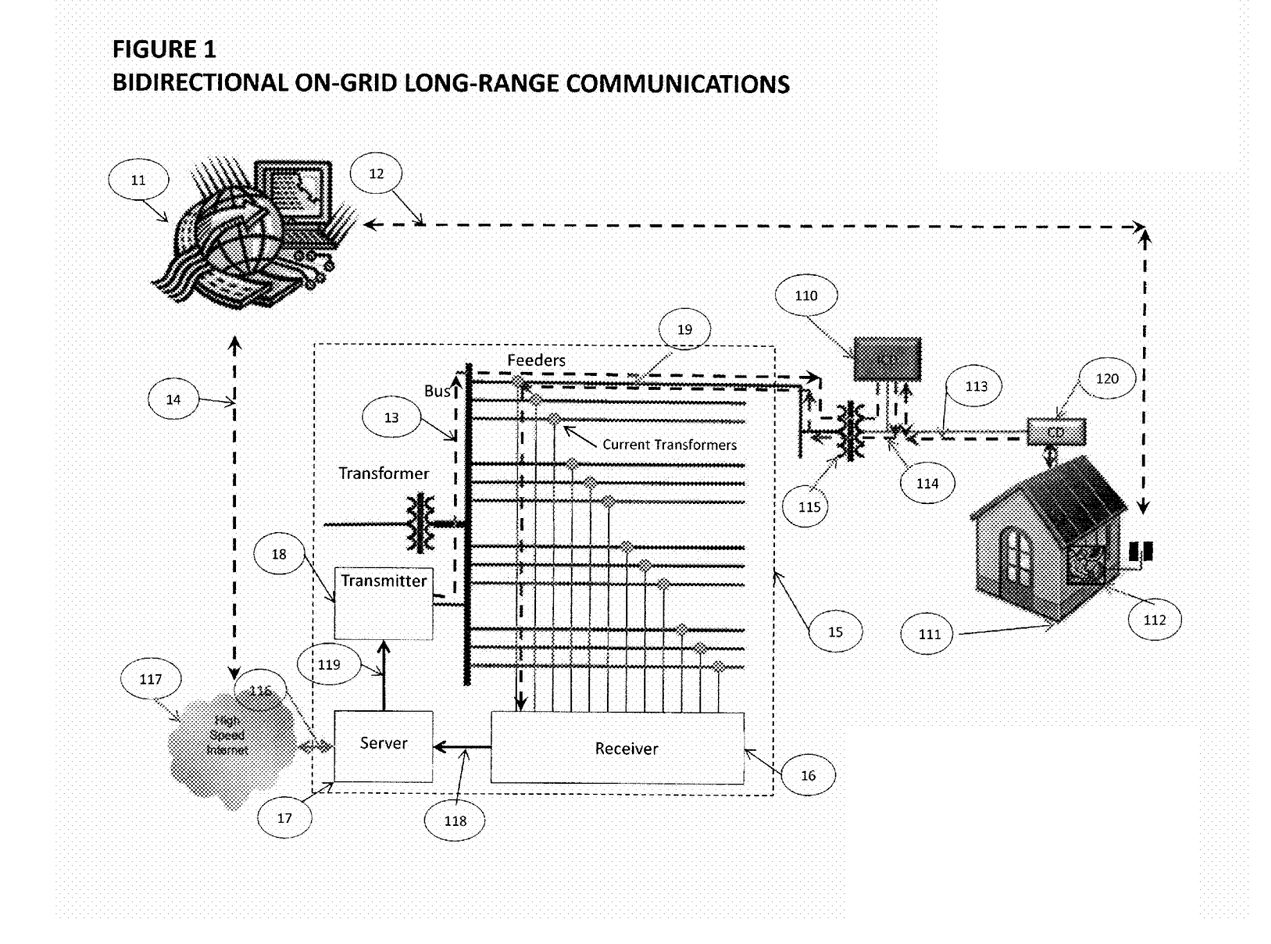
FIG. 1 illustrates a bi-directional on-grid long range communications system according to the present invention.

Referring to FIG. 1, the System may comprise: a Key Distribution Server (KDS) 11, a Device, PC, or Server 112 operated at a Building, Structure, or Location 111, where electrical power is provided to Building, Structure, or Location 111 by a distribution grid. The distribution grid may comprise at least one Distribution Substation 15 and at least one Service Transformer 115, wherein a Phase of a Feeder 19 of the at least one Substation supplies power to the Service Transformer 115, which in turn supplies power to Building, Structure, or Location 111. The Phase of a Feeder 19 from the Substation 15 to the Service Transformer 115 is a medium voltage or high voltage line, where medium voltage is defined to be equal to or in excess of 1 kilovolts (KV). The Key Distribution Server 11 is connected to the Internet or private Wide Area Network 117 via network interface 14, but is not required to be served by the same electrical distribution grid as the Building, Structure, or Location 111. The Internet or Wide Area Network 117 provides a bidirectional communication path. An intelligent communicating device (ICD) 110 is installed on the low-voltage side of Service Transformer 115. A Communicating Device (CD) 120, which is capable of local-only bidirectional on-grid communications with the ICD 110, is installed at an electrical meter serving Building, Structure, or Location 111. Said Device, PC, or Server 112 can attach directly to the CD via a direct connection such as serial or Ethernet, or can communicate with the CD via an on-grid home area protocol such as Homeplug. Such protocols are well-known in the art. The Device, PC, or Server 112 is also capable of using the local-only bidirectional on-grid communications method to communicate directly with the ICD, in which case the CD 120 is not required to be present but is permitted to be present for other purposes. Regardless of how the Device, PC, or Server 112 accesses it, there exists a local-only on-grid bidirectional communication path 113 between the ICD 110 and Building, Structure, or Location 111 which can be accessed only by a Device, PC, or Server 112 either plugged into wall-socket power at the Building, Structure, or Location 111 or connected directly by other physical means to the CD 120.

A Server 17 controlling a Receiver 16 and a Transmitter 18 is installed at the Distribution Substation 15. Server 17 has a bidirectional connection 116 to the Internet or private Wide Area Network 117. The Electrical Distribution Grid provides a unidirectional on-grid communications path 114 from the ICD 110 to the Server 17 via the Receiver 16 and Interface 118 to the Receiver, and a unidirectional on-grid communications path 13 from the Server 17 to the ICD 110 via the Transmitter 18 and Interface to the Transmitter 119. A conventional network communications path 12 provides an alternate route of connectivity between the Device, PC, or Server 112 and the Key Distribution Server (KDS) 11. Said bidirectional communication paths 12 and 117 can be any form supporting the TCP/IP protocol and can include, but are not limited to, wireless, leased lines, fiber, and Ethernet. In this and other embodiments, the KDS is the owner of a standard Public Key Infrastructure certificate and a trust relationship with the KDS has already been independently established by the Server 17 and the Device, PC, or Server 112.

In the method of Embodiment 1, the Device, PC, or Server 112 will initiate a request for a time-and-place secured Key Token by signaling the ICD 110 over local bidirectional on-grid communication path 113. The Device, PC, or Server's access to the communication path 113 is via the Device, PC, or Server's power cord or charger plugged into a standard wall socket in the Building, Structure, or Location 111, or by a direct physical connection to the CD 120. Upon sending the request, a software program stored on the Device, PC, or Server starts a Unique Request Timer for time window verification. Upon receiving the request, a software program stored on the ICD 110 is activated. The activated software program on the ICD 110 records a unique Requestor ID of the requesting Device, PC, or Server 112 and the time the request was received. The ICD 110 then selects a random time within the pre-determined interval of the Device, PC, or Server's Unique Request Timer at which to forward said request, together with the Requestor ID of the requesting Device, PC, or Server 112 and a unique Local ID of the ICD over the power grid by means of the on-grid unidirectional communications path 114 to Server 17. Upon transmitting said forwarded request, the ICD 110 starts a different, random Unique ICD Timer for time window verification, again within the pre-determined interval of the Unique Request Timer, associating the Unique ICD Timer with the ID of the requesting Device, PC, or Server 112.

When the forwarded request is received at the Receiver 16, the Receiver enhances the request to include at least the electrical phase and feeder(s) upon which the signal was received and the time at which the request was received. The Receiver 16 then passes said enhanced message on to the Server 17. Software stored and executed on the Server 17 uses the enhanced properties of the signal (known as the Grid Location) together with the time the message was received and the locally unique Local ID of the transmitting ICD 110 to determine the globally unique Physical ID of the ICD by comparing them with a Grid Map and Policies stored at Server 17. Any inconsistency between the enhanced properties of the message and the Grid Map and Policies shall be considered evidence of tampering, and shall cause the Server to reject the request.

If no evidence of tampering is found, the Server 17 and associated software program posts the request for a time-and-place secured Key Token along with the Requestor ID of the originating Device, PC, or Server 112, the unique physical ID, and the local ID of the relaying ICD over the conventional wide-area bidirectional data path 117 to the Key Distribution Server. The data path 117 between the Server 17 and the Key Distribution Server 11 is secured by conventional PKI means, a Certified and trusted relationship having previously been established between the Server and the Key Distribution Server.

Upon receiving the request from the Server 17, the Key Distribution Server 11 generates a Special Decryption Key and a Response ID, and returns the Special Decryption Key with the Response ID appended over the bidirectional data path 117 to the Server 17. The Server 17 in turn employs Transmitter 18 to send the Special Decryption Key and Response ID over the unidirectional on-grid data path 13 to the ICD 110. The Special Decryption Key can be either 1) a symmetric key for a well-known encryption scheme such as AES-128, or 2) the decryption half of an asymmetric key pair, where the encryption half of the pair is retained by the KDS 11. In either case, the key or key pair is stored on the KDS, associated with an expiration time and date and the unique ID and local ID of the ICD 110 and the Requestor ID of the Device, PC, or Server 112 and the Response ID. Other information may be added to the store as the KDS acquires information about the outcome of said request and said secured session or operation.

When the ICD 110 receives the Special Decryption Key and Response ID, the ICD first checks to ensure that its Unique ICD Timer has not expired. If the ICD timer has expired, then the ICD notifies the client software on the Device, PC, or Server 112 that the request has failed. Otherwise, the ICD notifies the Device, PC, or Server and associated client software that the transaction has succeeded, providing to the client software the ICD-assigned Requestor ID but not the Special Decryption Key. The client software checks to ensure that the Unique Request Timer has not expired. If the Unique Request Timer has expired, then the client application is notified that the request has failed.

Assuming that all success conditions are met, the client component residing on the Device, PC, or Server 112 initiates a separate Request over conventional communication path 12 directly to the KDS 11, transmitting the ICD-assigned Requestor ID. Identifying the correct stored Key by means of the Requestor ID, the KDS generates the requested permission or Key Token and encrypts it using either the previously stored Special Decryption Key (if the encryption method is symmetric) or the associated Special Encryption Key (if the encryption method is asymmetric). The KDS then responds to the separate Request from the Device, PC, or Server with the encrypted Key Token to which is appended the Response ID.

When the Device, PC, or Server 112 receives the encrypted Key Token and the Response ID, the client software on the Device, PC, or Server uses the Response ID to request the Special Decryption Key from the ICD 110. The ICD checks its unique ICD Timer again. If said unique ICD Timer has expired, then the ICD notifies the client software that the Request has failed. If the ICD Timer has not expired, the ICD sends the Special Decryption Key to the Device, PC, or Server. Device, PC, or Server 112 can now decrypt the Key Token, but the Special Decryption Key has never travelled over any network session between the KDS 11 and the Device, PC, or Server 112. This ensures the security of the Key Token even where a PKI-certified trust relationship between the KDS and the Device, PC, or Server has not been established.

The client software on the Device, PC, or Server checks the Unique Request Timer again, and, providing that it has still not expired, decrypts the Key Token and provides it to the application software. The application software then uses the Key Token as intended to unlock a software function, secure a transaction, or to secure access to media. If at any point in the key exchange process a timer expires, the application software has the option of initiating a new request procedure, provided that connectivity with the ICD 110 is still present.

Embodiment 2.

Figure 2:
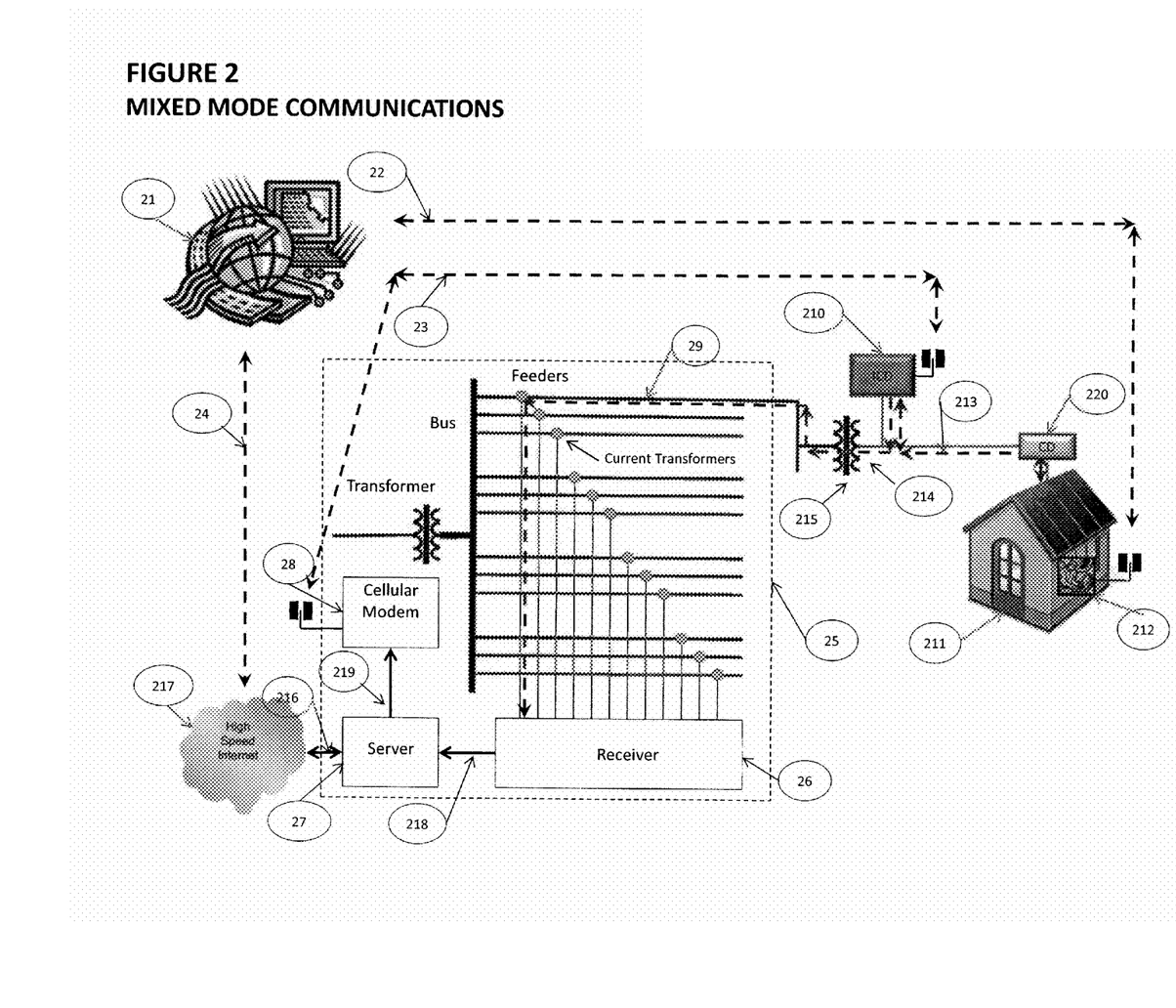
FIG. 2 illustrates an on-grid, mixed mode communications system where no on-grid long-range transmitter is available at the central collection points. A conventional network connection is substituted to permit communication from the central collection points to the ICDs.

FIG. 2 illustrates a second aspect of the present invention in which a unidirectional on-grid data path from the Server 27 to the ICD 210 is not available. Instead, said ICD 210 contains a cellular wireless modem which it uses to periodically poll on a public IP address of Server 27 over Internet access 23 provided by a commercial cellular service provider. Said polling by said ICD takes place over a secured SSL or TLS connection based on an established PKI trust relationship between the ICD 210 and the Server 27, with Server 27 being the certificate owner. Additionally, when said Server 27 has an urgent message for said ICD 210, such that too much time will elapse before said ICD is expected to poll again, the Server may cause the ICD to poll ahead of time by sending an alert to said ICD via the Short Message Service (SMS) protocol, which is well known in the art of cellular communications. Data Path 23 is hence a bi-directional data path between said Server 27 and said ICD 210. Data path 23 is treated as a limited resource because of the cost constraints on cellular machine-to-machine communications, and is not a substitute for communications between the ICD and the Server along unidirectional data path 214 because only said data path 214 supplies the grid location awareness required to validate the location of said ICD.

In similar embodiments, Data Path 23 may be any other form supporting TCP/IP including, but not limited to, leased line and/or Ethernet. In such embodiments not involving cellular wireless communications, polling by said ICD occurs frequently enough that no signal from said Server 27 to said ICD 210 analogous to said SMS message is required.

In this embodiment, the Server 27 has available to it, either stored locally in a database or accessible via a secure Web Service interface as is well known in the art of internetworking, a Provisioning database which allows the software executing on said Server to derive the SMS address (phone number or short code) of the ICD from its unique Physical ID.

Embodiment 2 is similar to Embodiment 1, except as regards Data Path 13 in Embodiment 1 and Data Path 23 in Embodiment 2. In Embodiment 2, when said Server 27 receives from the KDS 21 a Special Decryption Key with a Response ID appended over bidirectional data path 217, over the Internet or a Wide Area Network, to Server 27, the Server sends an SMS message to the ICD 210 which causes the ICD to immediately send a request for data (a poll) to said Server via a secure SSL or TLS connection over its cellular modem. In contrast, in Embodiment 1 and referring to FIG. 1, the Server responds to said request with Special Decryption Key and Response ID over data path 13 to said ICD 110, whereupon the key and token distribution process proceeds as in Embodiment 1.

All other aspects of Embodiment 2 function as described in Embodiment 1. KDS is attached to bidirectional data path 217 via interface 24. Server 27 is attached to bidirectional data path 217 via interface 216, and to Receiver 26 via interface 218. Cellular Modem 28 is attached to Server 27 via interface 219. A phase of a feeder 29 supplies a long range unidirectional data path 214 from the ICD 210 to the Server 27. The low-voltage electrical grid supplies bidirectional on-grid communication path 213 between ICD 210 and CD 220. Service Transformer 215 is supplied with power by substation 25 and supplies Building, Structure, or Location 211 with power. Device, PC, or Server 212 is powered by conventional means such as a wall-socket to a power source said Building, Structure, or Location 211 and may also have a non-power-line direct physical connection to CD 220. Conventional bi-directional data path 22 provides an alternative non-grid data path from Device, PC, or Server 212 to KDS 21.

Embodiment 3.

Figure 3:
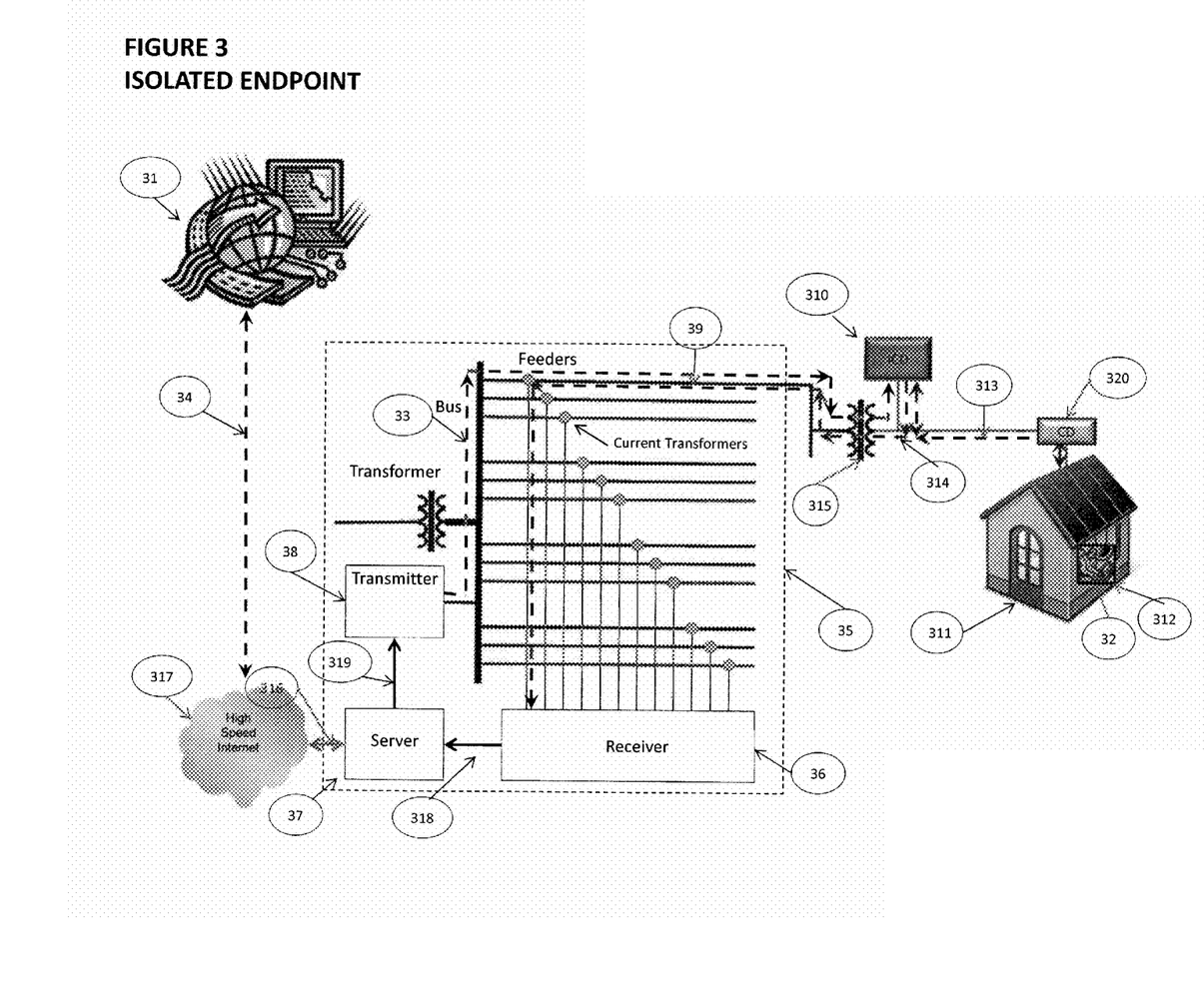
FIG. 3 illustrates the communication system of the present invention where bi-directional on-grid long range communication is available, but where the Device, PC, or Server has no connection to any conventional bi-directional network.

FIG. 3 illustrates aspects of where the Device, PC, or Server performing the secured operation lacks a direct connection to a conventional network. As shown in FIG. 3, the System comprises a Key Distribution Server (KDS) 31, and a Device, PC, or Server 312 operated at a Building, Structure, or Location 311. Attached to the Device, PC, or Server is a storage device 32 capable of writing data originating on said Device, PC, or Server to removable media. Electrical power is provided to Building, Structure, or Location 311 by a distribution grid. The distribution grid comprises at least one Distribution Substation 35 and at least one Service Transformer 315, wherein a Phase of a Feeder 39 of the at least one Substation supplies power to the Service Transformer 315, which in turn supplies power to Building, Structure, or Location 311. The Key Distribution Server 31 is connected to the Internet or private Wide Area Network 317 via interface 34, but is not required to be served by the same electrical distribution grid as the Building, Structure, or Location 311. The Internet or Wide Area Network 317 provides a bidirectional communication path between Server 37 and KDS 31. An ICD 310 is installed on the low-voltage side of Service Transformer 315. A CD 320, which is capable of local-only bidirectional on-grid communications with said ICD 310 via data path 313, is installed at an electrical meter serving Building, Structure, or Location 311. Said Device, PC, or Server 312 can attach directly to said CD via a direct connection, such as serial or Ethernet, or can communicate with said CD via an on-grid home area protocol such as Homeplug. Such protocols are well-known in the art. The Device, PC, or Server 312 is also capable of using said local-only bidirectional on-grid communications method to communicate directly with said ICD, in which case said CD 320 is not required to be present but is permitted to be present for other purposes. Regardless of how said Device, PC, or Server 312 accesses it, there exists a local-only on-grid bidirectional communication path 313 between said ICD 310 and Building, Structure, or Location 311 which can only be accessed by a Device, PC, or Server 312 plugged into wall-socket power at said Building, Structure, or Location 311 or connected directly by other physical means to said CD 320.

A Server 37 controlling a Receiver 36 and a Transmitter 38 is installed at the Distribution Substation 35. Said Server is connected to Receiver 36 via interface 318 and to Transformer 38 via interface 319. Server 37 has a connection 316 to the Internet or private Wide Area Network 317. The Electrical Distribution Grid provides a unidirectional on-grid communications path 314 from said ICD 310 to said Server 37 via said Receiver 36, and a unidirectional on-grid communications path 33 from said Server 37 to said ICD 310 via said Transmitter 38. In this embodiment, no conventional network communications path provides any alternate route of connectivity between said Device, PC, or Server 312 and said Key Distribution Server 31 or any other node on any local-area, wide-area network, or the Internet. The bidirectional communication path 317 can be any form supporting the TCP/IP protocol and can include, but is not limited to, wireless, leased lines, fiber, and Ethernet. In this and other embodiments, said KDS is the owner of a standard Public Key Infrastructure certificate and a trust relationship with the KDS has already been established by said Server 27. Further, in this embodiment said Server 37 and said ICD 310 have previously established a shared secret symmetric key by means of which communications along unidirectional data paths 33 and 314 are encrypted and decrypted. Said shared secret symmetric key may be used in any embodiment of the present invention, but is required in this embodiment.

In the method of Embodiment 3, said Device, PC, or Server 312 will initiate a request for a time-and-place secured Media Encryption Key by signaling said ICD 310 over local bidirectional on-grid communication path 313. The Device, PC, or Server's access to said communication path 313 is via said Device, PC, or Server's power cord or charger plugged into a standard wall socket in said Building, Structure, or Location 311, or by a direct physical connection to said CD 320. Upon sending said request, a software program stored on said Device, PC, or Server starts a Unique Request Timer for time window verification. Upon receiving said request, a software program stored on said ICD 310 is activated. The activated software program on the ICD 310 records a unique Requestor ID of said requesting Device, PC, or Server 312 and the time said request was received. As in Embodiment 1, said ICD 310 forwards said request, together with said Requestor ID of said requesting Device, PC, or Server 312 and a unique Local ID of said ICD over the power grid by means of said on-grid unidirectional communications path 314. Upon transmitting said forwarded request, the ICD 310 starts a different Unique ICD Timer for time window verification, associating said Unique ICD Timer with the ID of said requesting Device, PC, or Server 312.

When said forwarded request is received at said Receiver 36, the Receiver enhances the request to include at least the electrical phase and feeder(s) upon which the signal was received and the time at which said request was received before passing said enhanced message on to said Server 37. Software stored and executed on said Server 37 uses the enhanced properties of said signal (known as the Grid Location) together with the time the message was received and the unique Local ID of said transmitting ICD 310 to determine the unique Physical ID of said ICD by comparing them with a Grid Map and Policies stored at Server 37. Any inconsistency between the enhanced properties of said message and the Grid Map and Policies shall be considered evidence of tampering, and shall cause the Server to reject the request.

If no evidence of tampering is found, said Server 37 and associated software program posts the request for a time-and-place secured Media Encryption Key along with the Requestor ID of the originating Device, PC, or Server 312 and the unique physical ID and the local ID of the relaying ICD over the conventional wide-area bidirectional data path 317 to the Key Distribution Server. The bidirectional data path 317 from said Server 37 to and from said Key Distribution Server 31 is secured by conventional PKI means, a Certified and trusted relationship having previously been established between said Server and said Key Distribution Server.

Upon receiving said request from said Server 37 the Key Distribution Server 31 generates a Media Encryption Key and a Response ID, and returns the Media Encryption Key with the Response ID appended over bidirectional data path 317 to said Server 37. Said Server 37 in turn encrypts said Media Encryption Key and associated Requestor ID using said shared secret, encrypts said Response ID using the secret shared by said Server 37 and said KDS 31, concatenates the two encrypted messages, and employs Transmitter 38 to send said resulting message over the unidirectional on-grid data path 33 to said ICD 310. Said Media Encryption Key can be either 1) a symmetric key for a well-known encryption scheme such as AES-128, or 2) the encryption half of an asymmetric key pair, where the decryption half of the pair is retained by said KDS 31. In either case, said symmetric key or decryption half is stored on said KDS, associated with an expiration time and date, the unique ID and local ID of said ICD 310, the Requestor ID of said Device, PC, or Server 312, and said Response ID.

When ICD 310 receives said message containing said Media Encryption Key, the ICD first checks to ensure that its Unique ICD Timer has not expired. If said ICD timer has expired, then said ICD notifies said client software on said Device, PC, or Server 312 that the request has failed. Otherwise, the ICD notifies the Device, PC, or Server and associated client software that the transaction has succeeded, providing to the client software said ICD-assigned Requestor ID but not said Media Encryption Key. The client software checks to ensure that its Unique Request Timer has not expired. If said Timer has expired, then the client application is notified that the request has failed.

Assuming that all success conditions are met, the client component residing on Device, PC, or Server 312 requests the Media Encryption Key from said ICD 310. The ICD again checks the Unique ICD timer, and fails the request if the Unique ICD Timer has now expired. If it has not, the ICD returns to the Device, PC, or Server, over the bi-directional communication path 313, the Media Encryption Key and Requestor ID, and the still-encrypted Response ID. Note that neither the ICD 310 nor the Device, PC, or Server 311 alone has sufficient information to decrypt the Response ID.

Device, PC, or Server 311 now writes data to removable media via Storage Device 32 as follows: 1) said encrypted Response ID, 2) said Requestor ID in the clear, and 3) the data payload for which the Media Encryption Key was requested, encrypted by means of said Media Encryption Key.

The resulting Encrypted Media can now be securely removed from Building, Structure, or Location 311. To decrypt said Encrypted Media at another site, a Reader must recognize the media type, know the URL of said KDS 31, and have established a PKI-certified trust relationship with said KDS 31. The Reader then, using a secure and certified TLS or SSL session with said KDS, makes a Key Request of the KDS containing said Requestor ID and encrypted Response ID. The KDS uses the Requestor ID to determine the correct decryption key for the Response ID, decrypts said Response ID, and, provided that the decrypted Response ID matches said Requestor ID, returns the proper Media Decryption Key to the Reader, allowing the Encrypted Media to be deciphered. It will be apparent to one skilled in the art that the Grid Location information described in the present invention can be used to further restrict the use of the data on said Encrypted Media by ensuring that the Media Decryption Key is returned only to Readers at approved sites, whether the approved site is the same as or different from the Building, Structure, or Location 311 where the media was created. It will further be apparent that the method of Embodiment 3 is operable, though less secure, even if said Device, PC, or Server used to create said Encrypted Media has a conventional network connection.

Secure Session Embodiment.

In Embodiments 1, 2, and 3 one ordinarily skilled in the art will observe that the methods of the present invention are used to authenticate the site at which a secured session or operation, including the writing of encrypted media, takes place, and the time at which said session or operation begins.

The present invention ensures that a secured session or operation is completed within a prescribed time interval, and that the completion is at the site.

Referring again to FIG. 1, after providing said Device, PC, or Server 112 with the necessary Key or Key Token, said ICD 110 may start a new Unique Session Timer defining the time within which the secured session or operation must be completed. Said Unique Session Timer is not randomized, but reflects the actual expected time for completing the secured session or operation. The Key Token may encode the expected time, although other methods of determining the expected time may be used.

The client component software of the present invention provides the application software running on said Device, PC, or Server 112 which will carry out the secured session or operation with the Key and or Key Token required to initiate said secured session or operation. The client software component of the present invention then polls said ICD 110 at regular intervals until said application software notifies said client software that the secured session or operation is complete. If, prior to the completion of the secured session or operation, an attempt to poll said ICD should fail, the client software notifies the application software that the secured session or operation is compromised and must be aborted. A polling failure indicates that the host Device, PC, or Server 112 has been disconnected from the power source and hence potentially removed from said secured Building, Structure, or Location 111.

If the application software notifies the client software that the secured session or operation has completed successfully, then the client software notifies the ICD 110 of the completion event. If the Unique Session Timer has not expired, then the ICD cancels the Timer and sends a notification via secure unidirectional data path 114 to the Server 17 that the transaction associated with the Requestor ID has completed its work. Server 17 forwards the notification to the KDS 11, which marks the stored keys and other data associated with said Requestor ID as valid and complete.

If the Unique Session Timer expires on the ICD 110 and the client software running on the Device, PC, or Server 112 has not notified the ICD that the secured session or operation has been completed, the ICD sends a notification via secure unidirectional data path 114 to Server 17 that the secure session or operation associated with the Requestor ID has failed or been compromised. The Server 17 forwards the notification via the bi-directional data path 117 over the Internet or a Private Wide-Area Network to the KDS 11, which marks the stored keys and other data associated with the Requestor ID as invalid and untrustworthy.

If the ICD 11 experiences a power outage, then upon recovery software residing on the ICD checks the non-volatile storage associated with the ICD to determine whether any Unique Session Timers or Unique ICD (request) Timers were unexpired at the time of the power loss. If any such Timers are discovered, then the ICD again notifies the Server 17 and the KDS 11 that the associated keys, media, and requests are invalid and untrustworthy.

Designated Secure Sites Embodiment

Referring again to FIG. 1, it may be that in some Buildings, Structures, or Locations 111 which are served by a single ICD 110, such as hotels, convention centers, and the like, some rooms or sites within the Building, Structure, or Location are secure (e.g. a hotel room) and other rooms or sites within the same Building, Structure, or Location (e.g. a restaurant) are not secure. It is well known in the art that a power outlet installed in a Building, Structure, or Location can be enhanced with electronics such that said outlet is addressable by means of a local on-grid communication protocol such as Homeplug. To ensure that said secure sessions or operations with said Device, PC, or Server 112 are initiated only from secure sites within said Building, Structure, or Location, the software residing on said ICD can be configured such that any Request for a secure session or operation must reach said ICD by way of such an addressable outlet, and the client software on said Device, PC, or Server can be configured to obtain from the ICD information as to whether the address of such an enhanced outlet must accompany any Request for such a secure session or operation.

Means by which such enhanced outlets are authenticated by the local or home area network are well-known in the art. Use of such well-known authentication methods prevents users of mobile Devices or PCs from carrying an addressable plug-in outlet enhancer in order to subvert this requirement. This method may also be used in the case where one ICD serves a plurality of Buildings, Structures, or Locations which do not have attached CDs. When CDs are present, said CDs serve to differentiate one Building, Structure, or Location from another.

Other Embodiments

This description of the preferred embodiments of the invention is for illustration as a reference model and is not exhaustive or limited to the disclosed forms, many modifications and variations being apparent to one of ordinary skill in the art.

It should be recognized that the use of High Speed Internet to provide a bidirectional communication path, depicted in FIGS. 1, 2, and 3 as 117, 217 and 317 respectively, is only one method of providing the bi-directional communications path between the Server and the KDS, and that the invention may use alternate form of communications.

It should further be recognized that this invention may be enhanced in certain installations wherein the Service Transformer, depicted as element 115, 215 and, 315 in the Figures may be located in a physically secure site, such as within the building housing a Device, PC, and/or Server. As such, attack vectors attempting to directly attach equipment to the Grid would have to deal with Feeder voltage. Given the voltage range of Feeders in the USA, 4.1 KV to 34.5 KV (and higher elsewhere in the world) this physical/electrical impediment further strengthens the protective nature of this invention. Attachment and grid-related introduction of detection/communications equipment creates disturbances on the Grid, and therefore devices implementing this invention (e.g. said Receiver and said ICD) can be made to detect and protect against an attack vector.

We hereby claim:

1. A method for establishing a secure communication path over an electrical distribution grid, comprising:
    receiving, by a computing device, a signal from a receiver coupled to the electrical distribution grid in an electrical substation, the signal comprising:
        a request, received by the receiver via the electrical distribution grid from an intelligent communicating device (ICD) located at an edge of the electrical distribution grid, for a key token for use in secure communications;
        an electrical phase on which the signal was received by the receiver; and
        an electrical feeder on which the signal was received by the receiver;
    based on the electrical phase and the electrical feeder, inferring an inferred location of the ICD;
    based on the inferred location of the ICD, obtaining the key token; and
    causing, by the computing device, the key token to be communicated to the ICD via the electrical distribution grid.

2. The method of claim 1 wherein the request further comprises a unique identifier (ID) that uniquely identifies the ICD, and wherein based on the inferred location of the ICD, obtaining the key token comprises:
    accessing a grid map that correlates unique IDs of ICDs coupled to the electrical distribution grid to corresponding physical locations of the ICDs;
    determining that the inferred location of the ICD matches the physical location of the ICD identified in the grid map; and
    based on determining that the inferred location of the ICD matches the physical location of the ICD identified in the grid map, obtaining the key token.

3. The method of claim 1 wherein obtaining the key token comprises:
    sending a request to a key distribution server for the key token; and
    receiving the key token from the key distribution server.

4. A system for establishing a secure communication path over an electrical distribution grid, comprising:
    a computing device comprising:
        a communication interface; and
        a processor device coupled to the communication interface and configured to:
            receive a signal from a receiver coupled to the electrical distribution grid in an electrical substation, the signal comprising:
                a request received by the receiver via the electrical distribution grid from an intelligent communicating device (ICD) located at an edge of the electrical distribution grid for a key token for use in secure communications;
                an electrical phase on which the signal was received by the receiver; and
                an electrical feeder on which the signal was received by the receiver;
            based on the electrical phase and the electrical feeder, inferring an inferred location of the ICD;
            based on the inferred location of the ICD, obtaining a key token; and
            causing, by the computing device, a transmitter to transmit the key token to the ICD via the electrical distribution grid.

5. The system of claim 4 wherein the request further comprises a unique identifier (ID) that uniquely identifies the ICD, and wherein to obtain the key token the processor device is further configured to:
- access a grid map that correlates unique IDs of ICDs coupled to the electrical distribution grid to corresponding physical locations of the ICDs;
- determine that the inferred location of the ICD matches the physical location of the ICD identified in the grid map; and
- based on determining that the inferred location of the ICD matches the physical location of the ICD identified in the grid map, obtain the key token.

6. The system of claim 4 wherein to obtain the key token the processor device is further configured to:
- send a request to a key distribution server for the key token; and
- receive the key token from the key distribution server.

7. The system of claim 4, further comprising:
- the receiver; and
- the transmitter.

* * * * *